Feb. 17, 1970  I. H. CULVER  3,496,318
PRESSURE SWITCH WITH CALIBRATION AND TEST FEATURE
Filed Feb. 12, 1968
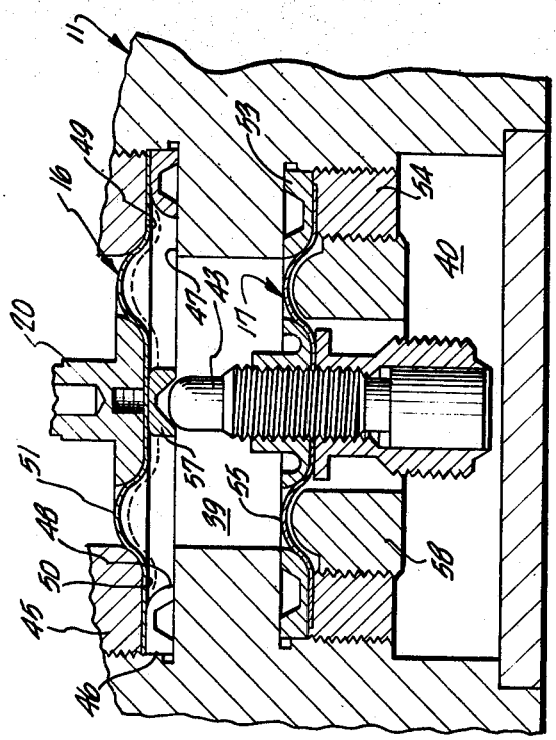
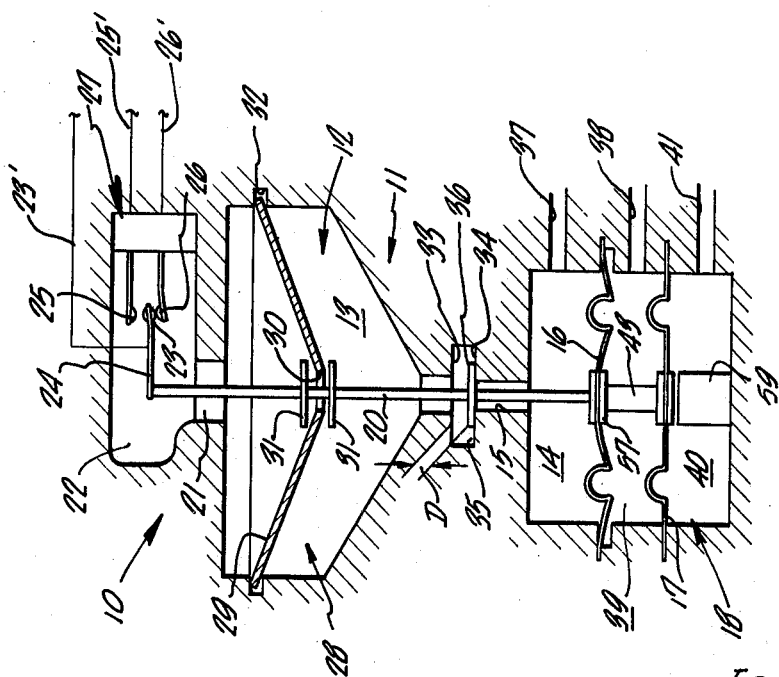
INVENTOR.
IRVEN H. CULVER
BY
Christie, Parker & Hale
ATTORNEYS.

United States Patent Office 3,496,318
Patented Feb. 17, 1970

3,496,318
**PRESSURE SWITCH WITH CALIBRATION
AND TEST FEATURE**
Irven H. Culver, Playa Del Rey, Calif., assignor to Southwestern Industries, Inc., Los Angeles, Calif., a corporation of California
Filed Feb. 12, 1968, Ser. No. 704,925
Int. Cl. H01h 35/40
U.S. Cl. 200—83                                13 Claims

ABSTRACT OF THE DISCLOSURE

A pressure sensitive switch operated by a principal diaphragm includes a second diaphragm for operating the switch by pressurized calibration fluid applied thereto. The principal and second diaphragms are arranged so that the switch itself cannot distinguish between operation by the principal diaphragm as opposed to operation by the second diaphragm. In operation of the switch by pressure applied to the second diaphragm, the pressure of fluid applied to the principal diaphragm is ambient or standard pressure. The principal diaphragm is mounted to have significantly lower stiffness when the switch is operated by calibration pressure than when the switch is operated by pressure applied to the principal diaphragm.

BACKGROUND OF THE INVENTION

Field of the invention

This invention pertains to pressure operated switches capable of being operated for calibration or test purposes by fluid separate from the fluid normally relied upon to operate the switch.

Review of the prior art

In modern missiles, fluid circuits such as liquid oxygen systems and the like often are controlled by pressure sensitive devices which sense fluid pressure in a particular location or line of the system and actuate switches, valves or solenoids to control fluid flow or fluid pressure at the same or other locations in the same or different systems, or to initiate a desired control function in an electrical system, for example.

These pressure sensitive control devices often are subjected to extreme operating conditions. For example, a device used in a rocket may be required to function throughout a temperature range extending from −350° F. to +350° F. and to withstand shock and vibration loading of up to 100 G's or more in magnitude. Moreover, such devices often must be responsive to relatively minute pressure differentials.

A control device in use today relies upon a bistable actuator which controls the operation of an electrical switch. The actuator includes a diaphragm to which is mounted a stem which moves in response to movement of the diaphragm; the fluid applied to this diaphragm is referred to herein as "system fluid," and the pressure of such fluid is referred to as "system pressure," the monitoring of system pressure being the basic purpose of the control device. Once the magnitude of system pressure reaches a predetermined high value of $P_1$, the stem is displaced against a resilient biasing mechanism from one to the other of its two stable positions, thereby to actuate the switch from one to the other of two operative conditions of the switch. If system pressure drops to a predetermined lower level, $P_2$, the diaphragm and the stem return to their initial positions and the switch is operated back to its original state.

Frequently the control functions provided by the device described above are critical. It is desirable, therefore, that such devices be susceptible of being calibrated or tested for functional operability and pressure level accuracy after being installed. Particularly in rockets and similar applications, it is not always feasible to test the device by applying system pressure to the diaphragm. Therefore, if any calibration or test capability is to be provided, such capability should result from structure operable by a calibration fluid which may be applied to the control device independently of system fluid. Previously available control devices of the type described above did not incorporate any test or calibration mechanism susceptible of functioning independently of the fluid applied to the device during actual use.

It is also desired that the calibration mechanism be constructed so that the switch itself cannot distinguish between operation by system pressure and operation by calibration pressure. Especially where the pressure levels to be monitored by the control device are close together, it is desirable that the pressure levels of calibration fluid applied to the device to produce operation of the switch be as nearly identical to the pressure levels of system fluid which produce corresponding operations of the switch.

SUMMARY OF THE INVENTION

This invention provides a calibration mechanism for a pressure sensitive control device of the general character described above. The present structure is arranged so that the mechanism which operates in response to movement of the principal diaphragm, to which system pressure is applied during actual use of the device, cannot distinguish between operation by system pressure and operation by calibration fluid applied to the device independent of system fluid. Further, the calibration mechanism is arranged so that the values of calibration pressure which produce operation of the device are essentially the same as the value of system pressure which produce operation of the device.

These features are provided by structure which is relatively simple in design, economical to construct, efficient to assemble, and reliable in operation.

Generally speaking, this invention resides in a pressure sensitive device which includes a principal diaphragm movable in response to system pressure applied thereto, system pressure being the pressure of the fluid to which the device is responsive in actual use. A responsive mechanism is coupled to the principal diaphragm and operates in response to movement of the principal diaphragm to perform a characteristic function when system pressure is of a selected value. In this context, the present invention provides an improvement in means for operating the responsive mechanism independently of system pressure. The inventive apparatus comprises a housing defining an internal cavity. A second diaphragm is disposed transversely of the cavity and has its periphery clamped to the housing. Means are provided for applying calibration fluid to one side of the second diaphragm. Mounting means mount the principal diaphragm transversely of the cavity in spaced parallel relation to the second diaphragm adjacent the other side of the diaphragm and clamp the principal diaphragm peripherally to the housing. Also, means are provided for applying system pressure to the cavity between the principal and second diaphragms, the side of the principal diaphragm opposite from the second diaphragm being communicated to a reference pressure. The apparatus also includes means which cooperate with the side of the principal diaphragm opposite from the second diaphragm to define a surface fixed relative to the housing and disposed circumferentially of the principal diaphragm radially inwardly of the location of peripheral clamping engagement of the mounting means with the principal diaphragm. The surface engages the adjacent side of the principal diaphragm when system pressure exceeds the value of the reference pressure, but the principal diaphragm is disengaged from the surface when pressure present between the diaphragms is not significantly greater than reference pressure. Further, the apparatus also includes means carried by the second diaphragm centrally thereof extending toward the principal diaphragm for engagement with the principal diaphragm, when the pressure of calibration fluid applied to the second diaphragm exceeds the pressure present between the diaphragms, to operate the responsive mechanism.

DESCRIPTION OF THE DRAWINGS

The above-mentioned and other features of this invention are more fully set forth in the following detailed description of a presently preferred embodiment of the invention, which description is presented with reference to the accompanying drawings, wherein:

FIG. 1 is a functionally simplified cross-sectional elevation view of a pressure switch incorporating the present invention; and FIG. 2 is an enlarged, cross-sectional elevation view of structure forming a part of the mechanism illustrated in FIG. 1.

DESCRIPTION OF THE PREFERRED EMBODIMENT

A diaphragm pressure switch 10, shown in simplified form in FIG. 1, includes a housing 11 defining an internal cavity 12 having an upper part 13 and a lower part 14 connected by a neck portion 15. A pair of spaced diaphragms 16 and 17 are disposed transversely of the lower part of the cavity and have their peripheries clamped to the housing. Diaphragm 16 is the principal operating diaphragm of switch 10 and, for clarity of subsequent description, is referred to hereinafter as a "system diaphragm," system fluid being applied to this diaphragm to produce operation of the switch. Diaphragm 17 is an auxiliary diaphragm, is a part of a switch calibrating and testing mechanism 18, and is referred to as a "calibration diphragm," the fluid applied to the calibration diaphragm to operate the same being referred to as "calibration fluid."

An operating stem 20 is connected at its lower end to the center of the system diaphragm and extends through neck 15 and cavity upper part 13 through an opening 21 communicating cavity 12 with a switch chamber 22. In the switch chamber, the stem carries an electrical contact pad 23 mounted to the free end of a resilient arm 24 which extends in cantilever fashion laterally from the stem. Contact pad 23 is insulated from the stem and is connected by a conductor 23' to an electrical circuit controlled by an electrical switch 27 of which pad 23 is a part. The contact pad cooperates alternatively, depending upon the operative state of the stem, between a pair of stationary switch contacts 25 and 26 insulatively mounted to the housing and connected by conductors 25' and 26' into the controlled circuit.

Between the system diaphragm and the switch mechanism, the stem is coupled to a biasing mechanism 28. As shown in FIG. 1, the biasing mechanism may include a Belleville spring 29 dispased concentric to the stem and having its inner rim 30 confined between a pair of keeper collars 31 secured to the stem on opposite sides of the disc of the Belleville spring. The outer periphery of the Belleville spring is disposed above the inner rim along the stem and is engaged in a recess 32 formed circumferentially of cavity 13. The Belleville spring is preloaded so that, throughout the range of travel permitted to the stem, the stem operates within that portion of its force versus deflection curve having a negative slope. That is, spring 29 has a negative spring rate in terms of upward travel of the stem and of loads imposed upon the spring by movement of the stem. The negative rate of spring 29 imparts a toggle action to the mechanism of switch 10, such action being desired in the type of switch described herein as a part of a presently preferred embodiment of the invention the essence of which is believed to reside in mechanism 18 and the mounting of diaphragm 16, described below.

The spring rate of any spring or resilient system is the slope manifested at any given point on the curve which is produced when the force applied to the spring is plotted vertically on Cartesian (X, Y) coordinates, and the deflection of the spring in response to applied loads is plotted horizontally. Coil springs, for example, show positive spring rates in that greater and greater deflections of the spring result in more and more force being developed by the spring. A negative spring rate indicates that, as the spring is deflected positively, the load resulting from such deflection is decreased in magnitude.

It should be understood quitet clearly at this point that the negative spring rate biasing mechanism mentioned above is described and illustrated merely as a part of the preferred embodiment of the invention explained herein in detail, and that a positive rate biasing mechanism, such as a coil spring or a leaf spring, could be used without departing from the broad scope of the present invention. Similarly, no biasing mechanism need be provided at all if the inherent resilience of diaphragm 16 is adequate for the purposes and uses contemplated in any specific application of the present invention.

Stem 20 is confined to reciprocatory motion between limits which are defined by opposite stop surfaces 33 and 34 of a recess 35 formed in the housing about the stem along neck 15. The stop surfaces cooperate with a stop collar 36 secured to the stem to limit movement of the stem to movement within displacement range D.

A vent port 37 is provided through the housing to that part of cavity 12 which lies above the system diaphragm to vent the adjacent side of the diaphragm to ambient pressure conditions. It should be understood, however, that the portion of cavity 12 lying above the system diaphragm and the switch chamber may be hermetically sealed rather than being vented to ambient conditions; for this reason, the pressure presented at any time to the upper side of the system diaphragm is referred to as "reference pressure." A port 38 communicates chamber 39, lying between diaphragms 16 and 17, to system fluid, the pressure of which is to be monitored by switch 10; chamber 39 is referred to as a "system chamber." A calibration chamber 40 is provided below the calibration diaphragm and is communicated to a source of calibration fluid by a port 41.

From the description presented thus far, it is apparent that switch 10 is a bistable mechanism responsive to pressure presented to system chamber 39 via port 38. Assume that the switch mechanism is in the condition shown in FIG. 1, with stop collar 36 engaged with bottom stop surface 34. Any increase in the pressure of fluid applied to the system chamber above a selected pressure $P_1$ will cause the stem to snap upwardly until the stop collar engages stop surface 33, thereby causing the contact pad carried by the stem to move from engagement with contact 26 into engagement with contact 25. Thereafter, the pressure applied to the underside of the system diaphragm must fall below a lower selected pressure $P_2$ to cause the stem to move back to its original state. The stem will not move upwardly until the pressure applied to the system diaphragm again rises above $P_1$. Thus, switch 10 responds to excursions of system pressure outside the pressure range between $P_1$ and $P_2$ to generate electrical signals used by structure (not shown) to perform desired control functions at locations external to housing 11. Upward movement of the stem is regarded as movement in a positive direction.

To test the operation of switch 10, or to calibrate the switch in terms of $P_1$ and $P_2$ applied to the system diaphragm, a calibration fluid is applied to calibration chamber 40 via port 41 from a source of calibration fluid, preferably a gas, at known pressures $P_1$ and $P_2$. The pressure of calibration fluid acting upon the calibration diaphragm causes the calibration diaphragm to deflect toward the system diaphragm and to cause a pin 43, carried by the calibration diaphragm coaxially of stem 20 to be mechanically separate from the system diaphragm, either to engage the system diaphragm opposite the stem and to displace the stem upwardly at a calibration pressure equivalent to system pressure $P_1$, or to allow the stem to return at a calibration pressure equivalent to system pressure $P_2$, whichever action is appropriate.

Assume that no portion of system pressure exceeding reference pressure is present in the system chamber when calibration fluid is applied to the calibration chamber. Assume, also, that the values of calibration pressure which cause the stem to move upwardly and downwardly in the manner described above are desired to be exactly the same as the values of system pressure which produce the same movements of the stem. If this last assumption is to be valid, it is necessary that the stiffness (K) of the calibration diaphragm at the time of actuation of the switch by calibration pressure, plus the stiffness of the system diaphragm at the same time, be equal to the stiffness of the system diaphragm at the time of actuation of the switch by system pressure. That is, it is desired that $$K_{C_A} + K_{S_O} = K_{S_A}$$

where $K_{C_A}$ is calibration diaphragm stiffness at the time of actuation of the switch by calibration pressure, $K_{S_O}$ is system diaphragm stiffness with no pressure differential thereacross, and $K_{S_A}$ is system diaphragm stiffness at the time of actuation of the switch by system pressure. If this relation is not met, the switch will be able to discern between operation by the system diaphragm as opposed to operation by the calibration diaphragm. If the pressure of calibration fluid which is productive of upward actuation of the stem, pressure $P_{A,C_1}$ (upward displacement of the stem being switch actuation state 1), is to be equal to the value of system pressure which produces a corresponding stem movement, pressure $P_{S,A_1}$, and if the value of calibration pressure which is productive of downward movement of the stem, pressure $P_{C,A_2}$ (downward displacement of the stem being actuation state 2), is to be equal to the value of system pressure $P_{S,A_2}$ productive of a corresponding stem movement, then the effective area $A_{C_A}$ of the calibration diaphragm when operated by calibration pressure must be equal to the effective area $A_{S_A}$ of the system diaphragm when operated by system pressure. If the foregoing relation between system and calibration pressures is to be maintained, it is necessary that the area and effective stiffness of the calibration diaphragm be as close as possible to that of the system diaphragm at actuation conditions. Since it is clear that the pressure of calibration fluid not only deflects the calibration diaphragm but also the system diaphragm, it is apparent that the stiffness $K_{S_A}$ of the system diaphragm when an actuating pressure differential exists thereacross must be much greater than the stiffness $K_{S_O}$ of the same diaphragm when reference pressure conditions exist on both sides of the diaphragm. That is, the stiffness of the system diaphragm at reference pressure conditions should be extremely low.

The desired similarity between the diaphragms at actuation conditions is assured by making the diaphragms of equal effective area, by a novel mounting system of the system diaphragm, and by making the calibration diaphragm slightly thinner than the system diaphragm.

As shown in FIG. 2, the actual physical diameter of system diaphragm 16 may be greater than the actual physical diameter of calibration diaphragm 17. The system diaphragm is clamped in housing 11 between upper and lower clamp rings 45 and 46, respectively. Clamp ring 46 is abutted against a shoulder 47 defined by the housing around the upper part of the system chamber, and the system diaphragm has its periphery engaged with the upper surface 48 of this ring. Ring 45 is secured in the housing circumferentially of stem 20 in such manner that the rim of the system diaphragm is securely clamped between its lower surface 49 and ring 46. Surface 49 extends in a common plane normal to the stem radially inwardly of lower ring 46 and then is radiused upwardly away from the system diaphragm beginning at 50. The system diaphragm defines a single upward annular convolution 51. The system diaphragm is constructed so that when no pressure differential exists across the diaphragm, the diaphragm engages surface 49 of ring 45 essentially only between rings 45 and 46 and does not engage the upper ring radially inwardly of lower ring 46; this unloaded state of the system diaphragm is illustrated in dashed lines in FIG. 2.

The mounting of the system diaphragm in the manner described above results in this diaphragm having an unloaded stiffness $K_{S_O}$ which is much lower than the stiffness the diaphragm would have in the event that the clamping engagement of ring 46 extended radially inwardly of the diaphragm to adjacent point 50 on surface 49 of ring 45. When system pressure exists in chamber 39, however, such that a pressure differential exists across the diaphragm, such pressure drives the diaphragm into engagement with surface 49 as shown in solid lines in FIG. 2. That is, system pressure itself is relied upon to clamp the diaphragm against surface 49, and the effect is the same as if ring 46 engaged the diaphragm radially inwardly to point 50 on surface 49.

The stiffness $K_{S_A}$ of diaphragm 16 when exposed to system pressure of value $P_{S,A_1}$ or $P_{S,A_2}$ is substantially higher than the unloaded stiffness $K_{S_O}$ of the same diaphragm because of the different effective areas of the diaphragm at these different conditions, and because of the internal stresses developed in the diaphragm when a pressure differential exists thereacross. The loaded stiffness $K_{S,A_1}$ (or $K_{S,A_2}$) of the system diaphragm is at least one to two orders of magnitude (10 to 100 times) greater than the unloaded stiffness $K_{S_O}$ of the system diaphragm and preferably is about 200 times or more greater than $K_{S_O}$. The greater the difference between these two stiffness values, the more nearly is realized the optimum situation contemplated by this invention. A very low unloaded stiffness of the system diaphragm means that the system and calibration diaphragms can be made more identical, and this assures that pressures present in the system and calibration chambers productive of movement of the stem will be as equal as possible.

Calibration diaphragm 17 is clamped between upper and lower clamp rings 53 and 54. Upper clamp ring 53 exactly reproduces surface 49 of clamp ring 45. Clamp ring 54 is engaged with diaphragm 17 inwardly of the diaphragm to adjacent the point on ring 53 which corresponds to point 50 on ring 45.

Like diaphragm 16, diaphragm 17 defines a single upward annular convolution 55, such convolution being concave downwardly like convolution 51 of diaphragm 16.

Diaphragms 16 and 17 have equal effective area. By Newtonian isolation theory the effective area of a diaphragm is the area within the cylinder defined by the loci of all points in the diaphragm at which internal stresses are aligned normal to the direction of deflection of the diaphragm when subjected to a pressure differential thereacross; in diaphragms 16 and 17, such loci correspond closely to the upper extents of convolutions 51 and 55.

Diaphragm 17 is made just enough thinner than diaphragm 16 that the difference between the stiffness $K_{S,A_1}$ of the system diaphragm at a system pressure productive of upward movement of the stem and the stiffness $K_{C,A_i}$ of the calibration diaphragm at a calibration pressure productive of upward movement of the stem is equal to the unloaded stiffness $K_{S_O}$ of the system diaphragm.

A bearing button 57 is mounted to the underside of the system diaphragm axially of stem 20 in line with pin 43 carried by the calibration diaphragm. When the system diaphragm is unloaded, the bearing button either rides lightly against or is spaced slightly from pin 43.

A back-up ring 58 is carried by calibration diaphragm clamp ring 54 below the relaxed position of the calibration diaphragm. The back-up ring prevents the calibration diaphragm from being blown downwardly an undue amount when substantial system pressure exists in chamber 39 and no or considerably less calibration pressure exists in chamber 40. If desired, the back-up ring can be replaced by a back-up post 59 centrally of the underside of the calibration diaphragm, as shown in FIG. 1.

Because there is normally no secure connection between pin 43 and bearing button 57, the presence of the calibration diaphragm in housing 11 has no effect upon the operation of the system diaphragm by system pressure in chamber 39. When calibration pressure is applied to chamber 40 (it being assumed that the pressure then existing in chamber 39 is reference pressure so that no pressure differential is developed across the system diaphragm), the engagement of pin 43 with bearing button 57 becomes effective so that upward movement of diaphragm 17 is effective to urge stem 20 upwardly when calibration pressure equals system pressure value $P_1$. The net stiffness against which calibration pressure $P_1$ must act is equal to the stiffness against which system pressure $P_1$ would have to act, were the device operated by system pressure, since $K_{C,A_1} + K_{S_O} = K_{S,A_1}$. Therefore, the stem itself cannot determine whether it is system pressure or calibration pressure which is urging it upwardly. Similarly, when calibration pressure is lowered from a value greater than $P_1$ to a value lower than $P_2$, the stem acts downwardly against the same spring stiffness it would have to counteract were system pressure dropped from a value above $P_1$ to a value below $P_2$. Thus, the stem cannot distinguish between a decrease in system pressure or an identical decrease in calibration pressure.

Calibration pressures $P_1$ and $P_2$ have the same effect as system pressures $P_1$ and $P_2$, respectively, because diaphragms 16 and 17 are made to have equal effective areas, because system diaphragm stiffness $K_{S_O}$ is made very low, and because $K_{C,A_1} = K_{S,A_1} - K_{S_O}$ and $K_{C,A_2} = K_{S,A_2} - K_{S_O}$. Therefore, calibration fluid can be applied to chamber 40 to calibrate device 10 in terms of system pressure values $P_1$ and $P_2$, and the operation of device 10 can be tested for its response to system pressures of given values by applying calibration pressures at the same values.

The mounting of system diaphragm 16 to housing 11 relative to the mounting of calibration diaphragm 17 to the housing is arranged in the preferred embodiment described so that, when the system diaphragm is operated by system pressure, it is effectively clamped mechanically and by pressure to the housing in a manner which is as identical as possible to the manner in which the calibration diaphragm is clamped, both mechanically and by calibration pressure, to the housing when the calibration diaphragm is operated by calibration pressure. It is apparent that the pressure clamping effect on the system diaphragm by system pressure is significantly greater than the pressure clamping effect upon the calibration diaphragm by calibration pressure. The system diaphragm mounting structure is arranged so that the system diaphragm, when operated mechanically by the calibration diaphragm, is clamped only mechanically in such a manner that this diaphragm has substantially less stiffness than when clamped mechanically and by pressure.

The calibration mechanism described above can be used to advantage with any diaphragm operated device. The principal diaphragm of the basic device can be connected to its responsive mechanism by some element other than a stem such as stem 20. Also, the responsive mechanism need not be a switch such as switch 27; it could be a differential transformer, a potentiometer, or a purely mechanical mechanism such as a valve in a fluidics system, for example.

Moreover, it is not necessary that the structure which gives the principal diaphragm a greater effective diameter when unloaded than when loaded be provided in the form described above. The portion of ring 45 which defines point 50 of surface 49 could easily be made separate from the structure which cooperates with ring 46 without departing from the scope of the present invention.

The term "system fluid," "system pressure," "calibration fluid" and "calibration pressure" are used herein as words of description rather than words of limitation to permit distinction between the two separate fluids, and their sources, associated with diaphragms 16 and 17 in the above-described structure.

Variations in the above-described structure additional to the variations mentioned above are also contemplated by the invention, and will occur to workers skilled in the art to which this invention pertains. Accordingly, the foregoing description should not be regarded as limiting the scope of the present invention, such description having been presented in furtherance of an explanation of a presently preferred embodiment of the invention.

What is claimed is:

1. In a pressure sensitive device including a principal diaphragm movable in response to operating fluid pressure applied thereto, a responsive mechanism coupled to the principal diaphragm and operable in response to movement of the principal diaphragm to perform a characteristic function when pressure to the principal diaphragm is of selected value, the improvement in means for operating the responsive mechanism independently of operating pressure and comprising:
    (1) a housing defining an internal cavity,
    (2) a second diaphragm disposed transversely of the cavity with its periphery clamped to the housing,
    (3) means for applying auxiliary fluid to one side of the second diaphragm,
    (4) mounting means mounting the principal diaphragm transversely of the cavity in spaced relation to the second diaphragm adjacent the other side of the diaphragm and clamping the principal diaphragm peripherally to the housing,
    (5) means for applying operating fluid to the cavity between the principal and second diaphragms, the side of the principal diaphragm opposite from the second diaphragm being communicated to a reference pressure,
    (6) means cooperating with the side of the principal diaphragm opposite from the second diaphragm defining a surface fixed relative to the housing and disposed circumferentially of the principal diaphragm radially inwardly of the location of peripheral clamping engagement of the mounting means with the principal diaphragm, the surface engaging the adjacent side of the principal diaphragm when operating fluid pressure exceeds reference pressure, the principal diaphragm being disengaged from the surface when pressure persent between the diaphragms is not significantly greater than reference pressure, and
    (7) means carried by the second diaphragm extending toward the principal diaphragm for engagement with the principal diaphragm to displace the same and operate the responsive mechanism when auxiliary pressure exceeds the pressure present between the diaphragms.

2. Apparatus according to claim 1 wherein the principal and second diaphragms are mounted so that the effective clamping engagement, mechanical and pressure induced, of the principal diaphragm with the housing when the principal diaphragm is operated by operating fluid pressure is essentially identical to the effective clamping engagement, mechanical and pressure induced, of the second diaphragm with the housing when the second diaphragm is operated by auxiliary pressure.

3. Apparatus according to claim 1 wherein the effective area of the principal diaphragm when engaged with the surface by reason of operating fluid pressure being greater than reference pressure is essentially equal to the effective area of the second diaphragm when deflected toward the first diaphragm by auxiliary fluid pressure exceeding pressure present between the diaphragms.

4. Apparatus according to claim 1 wherein the principal diaphragm has a first stiffness when operated mechanically and a second substantially greater stiffness when operating fluid pressure exceeds reference pressure sufficiently to deflect the principal diaphragm adequately to operate the responsive mechanism, and wherein the second diaphragm has a stiffness substantially equal to the difference between the principal diaphragm first and second stiffnesses when deflected sufficiently to operate the responsive mechanism by auxiliary pressure.

5. Apparatus according to claim 4 wherein the stiffness of the second diaphragm when deflected sufficiently to operate the responsive mechanism by a pressure differential thereacross is substantially more nearly equal to the principal diaphragm second stiffness than to the principal diaphragm first stiffness.

6. Apparatus according to claim 4 wherein the principal diaphragm second stiffness is at least one order of magnitude greater than the first stiffness of the same diaphragm.

7. Apparatus according to claim 1 wherein the diaphragms are coaxially aligned, the effective area of the principal diaphragm when deflected to operate the responsive mechanism is essentially equal to the effective area of the second diaphragm when deflected by a pressure differential thereacross to operate the responsive mechanism, the principal diaphragm when deflected by a pressure differential thereacross to operate the responsive means has a first stiffness which is at least about one order of magnitude greater than a second stiffness possessed by the diaphragm when substantially no pressure differential exists thereacross, and the second diaphragm has a stiffness when deflected by a pressure differential thereacross to operate the responsive means which is essentialy equal to the difference between the principal diaphragm first and second stiffnesses.

8. Apparatus according to claim 7 wherein the principal diaphragm first stiffness is about two hundred times greater than the second stiffness.

9. Apparatus according to claim 7 wherein the responsive mechanism is coupled to the principal diaphragm axially thereof, and the means carried by the second diaphragm comprises a pin mounted to the second diaphragm axially thereof and extending along said axis toward abutting engagement with the principal diaphragm.

10. Apparatus according to claim 9 wherein the second diaphragm is clamped to the housing between a pair of rings secured to the housing, the one ring engaged with the side of the second diaphragm toward the principal diaphragm having a configuration along the inner radius thereof identical to the configuration of said surface, and the principal diaphragm mounting means includes a pair of clamp rings secured to the housing and between which the outer margin of the principal diaphragm is clamped, the clamp ring engaged with the side of the principal diaphragm toward the second diaphragm having an effective inner radius greater than the inner radius of the one ring associated with the second diaphragm.

11. Apparatus according to claim 10 wherein said surface is defined by the clamp ring engaged with the side of the principal diaphragm opposite from the second diaphragm.

12. A pressure responsive switch comprising:
(1) a housing defining an internal cavity,
(2) a principal switch operating diaphragm disposed transversely of the cavity,
(3) an auxiliary switch operating diaphragm disposed transversely of the cavity in coaxial spaced alignment with the principal diaphragm,
(4) clamp means clamping the outer margins of the diaphragms to the housing and including:
   (a) a first clamp ring engaged with the side of the auxiliary diaphragm disposed toward the principal diaphragm,
   (b) a second clamp ring engaged with the side of the principal diaphragm disposed away from the auxiliary diaphragm and having essentially identical inner radius and configuration adjacent thereto as the first clamp ring, and
   (c) a third clamp ring engaged with the side of the principal diaphragm disposed toward the auxiliary diaphragm and having an inner radius greater than the inner radii of the first and second clamp rings,
(5) an electrical switch in the housing,
(6) operating means coupled from the switch to the principal diaphragm centrally thereof on the side thereof opposite from the auxiliary diaphragm and including means biasing the principal diaphragm into a deflection state thereof in which said diaphragm is disengaged from the second clamp ring radially inwardly of the inner radius of the third clamp ring,
(7) means for applying principal operating fluid to the cavity between the diaphragms, the principal diaphragm responding to a pressure differential thereacross produced by the pressure of principal operating fluid being greater than a reference pressure applied to the opposite side thereof to deflect away from the auxiliary diaphragm into engagement with the second clamp ring radially inwardly of the third clamp ring and to operate the switch,
(8) a member carried by and extending axially from the auxiliary diaphragm toward abutting engagement with the principal diaphragm,
(9) means for applying auxiliary operating fluid to the cavity adjacent the side of the auxiliary diaphragm opposite to the principal diaphragm for deflecting the auxiliary diaphragm toward the principal diaphragm in response to the pressure of auxiliary flu:d being greater than reference pressure (the pressure of fluid present in the cavity between the diaphragms then being substantially equal to reference pressure) to engage the member with the principal diaphragm, to deflect the principal diaphragm, and to operate the switch,
(10) the diaphragms being so configured that the effective areas thereof are equal when deflected by pressure differentials thereacross to operate the switch,
(11) the principal diaphragm having a first stiffness when deflected by a pressure differential thereacross to operate the switch which is about two orders of magnitude greater than a second stiffness thereof when the principal diaphragm is in said deflection state and substantially no pressure differential exists thereacross,
(12) the auxiliary diaphragm when deflected by a pressure differential thereacross to operate the switch having a stiffness essentially equal to the difference between the principal diaphragm first and second stiffnesses, whereby the switch is unable to distinguish between operation thereof in response to principal operating pressure and operation in response to auxiliary operating pressure, and the value of auxiliary operating pressure productive of switch operation is essentially equal to the value of principal operating fluid pressure productive of corresponding operation of the switch.

13. Apparatus according to claim 12 wherein the principal diaphragm biasing means has a negative spring rate in terms of deflection of the principal diaphragm away from the auxiliary diaphragm.

References Cited

UNITED STATES PATENTS

| | | | |
|---|---|---|---|
| 2,767,973 | 10/1956 | Ter Veen et al. | 267—161 |
| 2,883,485 | 4/1959 | Willard. | |
| 2,916,577 | 12/1959 | Smith. | |
| 2,945,629 | 7/1960 | Chute et al. | 267—161 XR |
| 3,107,766 | 10/1963 | Pritchard | 267—161 XR |
| 3,259,383 | 7/1966 | Johnson et al. | 267—161 |
| 3,442,180 | 5/1969 | Babic | 73—407 XR |

ROBERT K. SCHAEFER, Primary Examiner

J. R. SCOTT, Assistant Examiner

U.S. Cl. X.R.

73—407; 267—161

PO-1050
(5/69)

UNITED STATES PATENT OFFICE
CERTIFICATE OF CORRECTION

Patent No. 3,496,318      Dated Feb. 17, 1970

Inventor(s) Irven H. Culver

It is certified that error appears in the above-identified patent and that said Letters Patent are hereby corrected as shown below:

Column 2, line 38 "value" should read --values--.

Column 3, line 44 "diphragm" should read --diaphragm--; line 65, "dispased" should read --disposed--.

Column 4, line 20 "quitet" should read --quite--.

Column 5, line 42 "$P_{A,C_1}$" should read $$--P_{C,A_1}--.$$

Column 6, line 74 "$K_{C,A_1}$" should read $$--K_{C,A_1}--.$$

Column 9, line 45 "essentialy" should read --essentially--.

Column 10, line 72 after "operating" insert --fluid--.

SIGNED AND
SEALED
JUL 21 1970

(SEAL)
Attest:

Edward M. Fletcher, Jr.
Attesting Officer

WILLIAM E. SCHUYLER, JR.
Commissioner of Patents